(12) United States Patent
Chakrala et al.

(10) Patent No.: US 11,531,624 B2
(45) Date of Patent: Dec. 20, 2022

(54) ADDRESS TRANSLATION IN A DATA PROCESSING APPARATUS

(71) Applicant: ARM Limited, Cambridge (GB)

(72) Inventors: Viswanath Chakrala, Sheffield (GB); Andrew Brookfield Swaine, Sheffield (GB)

(73) Assignee: Arm Limited, Cambridge (GB)

(*) Notice: Subject to any disclaimer, the term of this patent is extended or adjusted under 35 U.S.C. 154(b) by 387 days.

(21) Appl. No.: 15/007,529

(22) Filed: Jan. 27, 2016

(65) Prior Publication Data

US 2016/0232106 A1    Aug. 11, 2016

(30) Foreign Application Priority Data

Feb. 6, 2015  (IN) .............................. 598/CHE/2015

(51) Int. Cl.
*G06F 12/1027*    (2016.01)

(52) U.S. Cl.
CPC .... *G06F 12/1027* (2013.01); *G06F 2212/681* (2013.01)

(58) Field of Classification Search
None
See application file for complete search history.

(56) References Cited

U.S. PATENT DOCUMENTS

| | | | | |
|---|---|---|---|---|
| 9,619,402 | B1* | 4/2017 | Zhang | G06F 12/1027 |
| 2002/0144077 | A1* | 10/2002 | Andersson | G06F 12/145 |
| | | | | 711/203 |
| 2012/0290813 | A1* | 11/2012 | Kong | G06F 12/1009 |
| | | | | 711/206 |
| 2014/0380024 | A1* | 12/2014 | Spadini | G06F 9/3834 |
| | | | | 712/217 |

FOREIGN PATENT DOCUMENTS

| | | |
|---|---|---|
| GB | 2523605 | 9/2015 |
| WO | 2014/122414 | 8/2014 |

OTHER PUBLICATIONS

Office Action for IN Application No. 598/CHE/2015 dated Feb. 22, 2021, 8 pages.

* cited by examiner

*Primary Examiner* — Larry T Mackall

(74) *Attorney, Agent, or Firm* — Nixon & Vanderhye P.C.

(57) ABSTRACT

Apparatus for data processing and a method of data processing are provided. Address translation storage stores address translations between first set addresses and second set addresses, and responds to a request comprising a first set address to return a response comprising a second set address if the required address translation is currently stored therein. If it is not the request is forwarded towards memory in a memory hierarchy. A pending request storage stores entries for received requests and in response to reception of the request, if a stored entry for a previous request indicates that the previous request has been forwarded towards the memory and an expected response to the previous request will provide the address translation, intercepts the request to delay its reception by the address translation storage. Bandwidth pressure on the address translation storage is thus relieved.

15 Claims, 5 Drawing Sheets

ADDRESS TRANSLATION IN A DATA PROCESSING APPARATUS

CROSS-REFERENCE TO RELATED APPLICATION(S)

This application claims priority to IN Patent Application No. 598/CHE/2015 filed 6 Feb. 2015, the entire content of which is hereby incorporated by reference.

TECHNICAL FIELD

The present disclosure relates to data processing. More particularly it relates to the translation of addresses between a first set of addresses and a second set of addresses.

BACKGROUND

It is known to provide a data processing system in which a first set of "virtual addresses" of a virtual memory system are used by, for example, an operating system being run, and a second set of "physical addresses" are used by, for example, a memory device in the system. The translation definitions between these two systems are commonly stored in so-called page tables in memory, and in this context it is further known to provide address translation capability in the data processing system, for example in the form of a memory management unit. The memory management unit can cache copies of the translation definitions in one or more translation lookaside buffers, which respond to translation requests comprising a virtual address by providing the corresponding physical address.

It is further known that a data processing system may comprise more than one master device which requires address translations to be performed, and that each master device can have its own "level 1" associated translation lookaside buffer to do this, whilst a shared "level 2" translation lookaside buffer can also be provided which handles address translation requests passed on to it from the individual translation lookaside buffers of multiple master devices (when they are not able to complete a particular translation request).

SUMMARY

Viewed from a first aspect the present techniques provide an apparatus for data processing comprising:

data processing circuitry to perform data processing operations on data items stored in a memory and retrieved via a memory hierarchy;

address translation storage to store address translations between first set addresses and second set addresses, wherein the address translation storage is responsive to a request issued by the data processing circuitry comprising a first set address to return a response comprising a second set address if an address translation between the first set address and the second set address is stored in the address translation storage, and to forward the request towards the memory in the memory hierarchy if the address translation between the first set address and the second set address is not stored in the address translation storage; and pending request storage to store entries for received requests, wherein the pending request storage is responsive to reception of the request, if a stored entry for a previous request is indicative that the previous request has been forwarded towards the memory and an expected response to the previous request will provide the address translation, to intercept the request to delay its reception by the address translation storage.

Viewed from a second aspect the present techniques provide a method of data processing comprising the steps of:

performing data processing operations on data items stored in a memory and retrieved via a memory hierarchy;

storing address translations between first set addresses and second set addresses in address translation storage;

responding to a request issued as part of performing data processing operations comprising a first set address to return a response comprising a second set address if an address translation between the first set address and the second set address has been stored in the storing address translations step;

forwarding the request towards the memory in the memory hierarchy if the address translation between the first set address and the second set address has not been stored in the storing address translations step;

storing entries for received requests in a pending request storage; and if a stored entry in the pending request storage for a previous request is indicative that the previous request has been forwarded towards the memory and an expected response to the previous request will provide the address translation, intercepting the request to delay its reception by the address translation storage.

Viewed from a third aspect the present techniques provide an apparatus for data processing comprising:

means for performing data processing operations on data items stored in a memory and retrieved via a memory hierarchy;

means for storing address translations between first set addresses and second set addresses;

means for responding to a request issued by the means for performing data processing operations comprising a first set address to return a response comprising a second set address if an address translation between the first set address and the second set address has been stored in the means for storing address translations;

means for forwarding the request towards the memory in the memory hierarchy if the address translation between the first set address and the second set address has not been stored in the means for storing address translations;

means for storing entries for received requests in a pending request storage; and means for intercepting the request to delay its reception by the means for storing address translation if a stored entry for a previous request is indicative that the previous request has been forwarded towards the memory and an expected response to the previous request will provide the address translation.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

Figure 1:
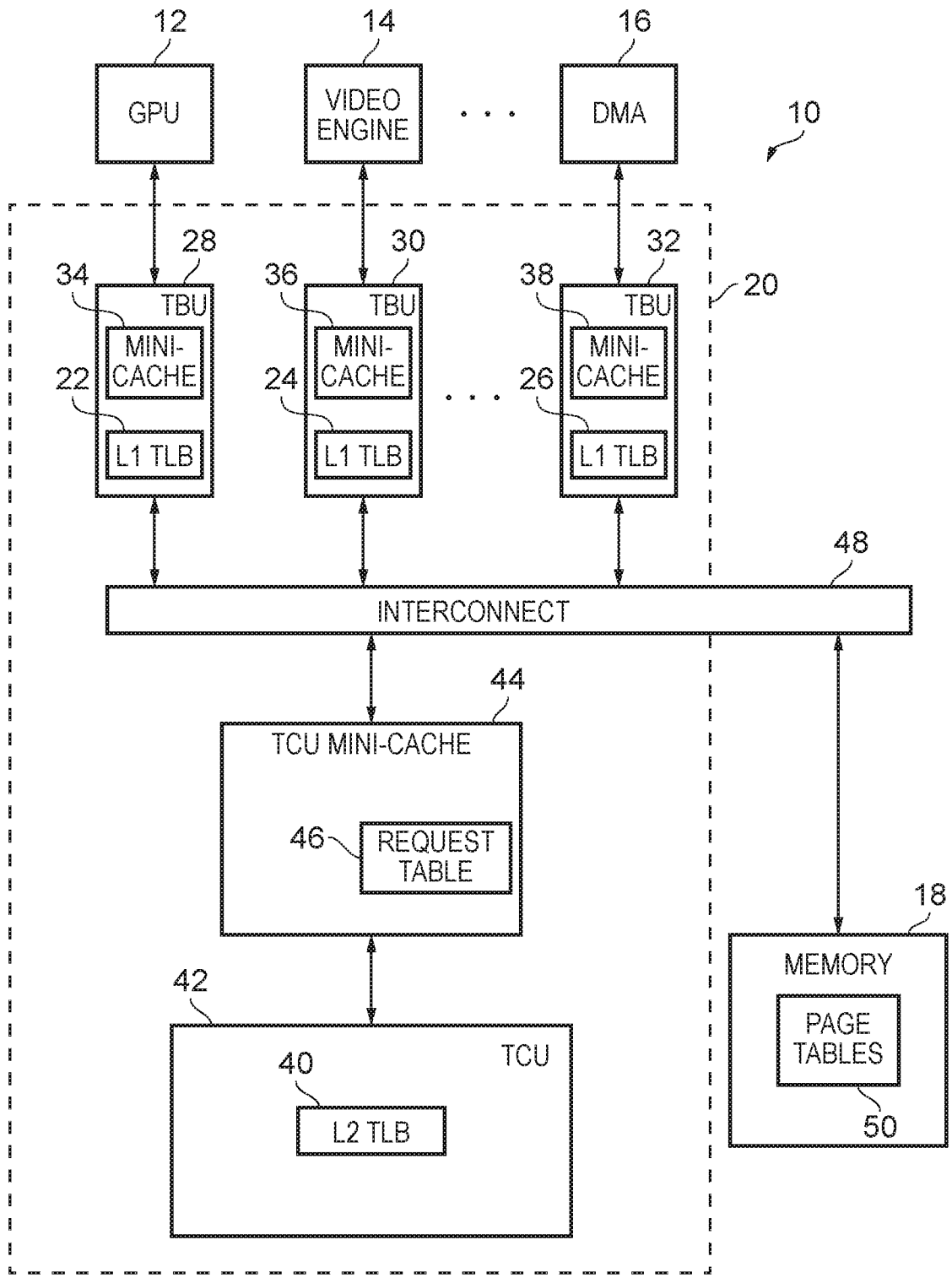
FIG. 1 schematically illustrates a data processing system in one embodiment.

At least some embodiments provide an apparatus for data processing comprising: data processing circuitry to perform data processing operations on data items stored in a memory and retrieved via a memory hierarchy; address translation storage to store address translations between first set addresses and second set addresses, wherein the address translation storage is responsive to a request issued by the data processing circuitry comprising a first set address to return a response comprising a second set address if an address translation between the first set address and the second set address is stored in the address translation storage, and to forward the request towards the memory in the memory hierarchy if the address translation between the first set address and the second set address is not stored in the address translation storage; and pending request storage to store entries for received requests, wherein the pending request storage is responsive to reception of the request, if a stored entry for a previous request is indicative that the previous request has been forwarded towards the memory and an expected response to the previous request will provide the address translation, to intercept the request to delay its reception by the address translation storage.

The present techniques recognise that a component provided to allow address translation in a data processing apparatus may suffer from capacity or bandwidth problems. This may happen in various different types of components at various locations in the data processing apparatus, but for example in a system-level memory management unit (SMMU) having a translation control unit (TCU) comprising a level 2 (L2) translation lookaside buffer (TLB), when the TCU receives address translation requests forwarded to it from multiple level 1 (L1) TLBs the time required to perform the lookups in the TCU can mean that the TCU becomes a bottleneck and the rate-limiting-step for SMMU throughput. Whilst it would be possible to simply increase the capability and capacity of the TCU in this situation, this approach comes at the cost of adding size and complexity to a device which already has a non-trivial configuration.

The present techniques address this problem by the provision of pending request storage, which stores entries for each request received. By monitoring the requests received, and in particular the address translations (e.g. page table walks) which they have specified, it can be determined when a (later) request is received if an earlier request has already specified an address translation which is expected to fulfil the address translation requirement of the later request. For example an address translation for the earlier request may have triggered a page table walk which it can be also comprise the address translation of the later request. When the address translation storage is not able to directly respond to a request (because the require translation is not currently stored therein) it forwards the request towards the memory in the memory hierarchy. For example, an L1 TLB can forward the request to an L2 TLB, or an L2 TLB can forward the request to the memory itself. Indeed the present techniques encompass examples where the forwarding may be between components at a given level, e.g. from one component of an L2 TCU to another as will be discussed in more detail below. In this situation the pending request storage can relieve capacity pressure without degrading performance by intercepting a request where it is known that the expected response for an earlier request will provide the required address translation, and (temporarily) holding it back from progressing further until that response is received. Once received, both the earlier request and the later request can then be directly responded to.

The apparatus may have various configurations, but in some embodiments the data processing circuitry comprises multiple master devices and the pending request storage has structure to store requests from each of the multiple master devices. As such, the pending request storage may thus be provided as an L2 component.

In such embodiments the apparatus may further comprise a translation lookaside buffer to store address translations between first set addresses and second set addresses for the multiple master devices, and wherein the address translation storage is a cache associated with the pending request storage, and wherein forwarding the request towards the memory in the memory hierarchy comprises forwarding the request to the translation lookaside buffer. This may therefore be an L2 TLB for example provided as part of a translation control unit (TCU) at L2. Note that the address translation storage is provided in association with the pending request storage, and if the address translation storage does not have the requested translation currently stored, the request is forwarded to the TLB. The address translation storage (which is a cache) and pending request storage in such embodiments thus form an additional stage at L2 which precedes the TLB. This additional stage is referred to herein with reference to some embodiments as a TCU mini-cache.

In some embodiments the data processing circuitry comprises a master device capable of issuing the request and the pending request storage is capable of storing requests from only the master device. In other words the pending request storage may only be concerned with requests from one master device and as such may itself be provided as an L1 component in close association with the master device.

In some such embodiments the address translation storage is a translation lookaside buffer to store address translations between first set addresses and second set addresses for the master device. Thus, whilst in some embodiments the address translation storage forms part of a separate component to a translation lookaside buffer (as is the case in the above-mentioned example of the additional stage referred to as a TCU mini-cache), in these embodiments the address translation storage is itself a translation lookaside buffer, for example an L1 TLB.

In some such embodiments forwarding the request towards the memory in the memory hierarchy means comprises forwarding the request to a further translation lookaside buffer shared with at least one other master device. For example where the address translation storage is an L1 TLB, requests for which a translation are not currently stored in the L1 TLB can be forwarded to an L2 TLB shared with other master devices.

In some such embodiments the pending request storage is has a cache structure and is responsive to reception of the request to perform a lookup in the cache structure to determine if an entry is stored for the previous request and if the expected response to the previous request will provide the address translation. This pending request storage may for example be provided within a TBU at L1 and is referred to herein with reference to some embodiments as a TBU mini-cache.

The nature of the entries in the pending request storage may take a variety of forms but in some embodiments each of the entries stored in the pending request storage comprises a reference to an entry in the address translation storage. This not only provides a storage efficient manner of storing these entries, but also facilitates the administration of the association between the entries of the pending request storage and the address translation storage.

The manner in which two entries may be associated in the pending request storage when it is recognised that the response for one request will also fulfill another may take a variety of forms, but in some embodiments the pending request storage is responsive to the stored entry for the previous request being indicative that the previous request has been forwarded towards the memory and the expected response to the previous request will provide the address translation to store a link from the entry for the request to the stored entry for the previous request.

In some embodiments each of the entries stored in the pending request storage comprises a status indicator, wherein the status indicator indicates a pending status whilst a response has not yet been received to a request corresponding to that entry which has been forwarded towards the memory in the memory hierarchy. This facilitates the administration of monitoring those entries which have caused a request to be forwarded.

In some embodiments the pending request storage is responsive to reception of the request, if the stored entry for the previous request comprises the status indicator indicating the pending status, to store a dependent waiting status as the status indicator corresponding to the request. Thus those entries for requests which are expected to be fulfilled by earlier forwarded requests can also be readily tracked.

In some embodiments the pending request storage is responsive to reception of the response to release a request for which the entry in the pending request storage has the status indicator indicating the pending status such that it is received by the address translation storage. Once the response has arrived the required translation is then available and the request which triggered that response can then be fulfilled by the address translation storage and the pending request storage need not (indeed should not) hold it up further from reaching the address translation storage.

In some such embodiments the pending request storage is responsive to reception of the response to release a request for which the entry in the pending request storage has the status indicator indicating the dependent waiting status such that it is received by the address translation storage. Once the response has arrived the required translation is then available and other requests than the one which triggered that response, but which were intercepted and held up because of their request could be fulfilled by the same response, can be fulfilled by the address translation storage and the pending request storage need not (indeed should not) hold it up further from reaching the address translation storage.

The pending request storage may be capable of determining if the expected response to the previous request will provide the address translation for the request by comparison of the first set address of the request with the first set address of the previous request. This may only be a portion of the respective addresses, e.g. a tag portion of each.

At least some embodiments provide a method of data processing comprising the steps of: performing data processing operations on data items stored in a memory and retrieved via a memory hierarchy; storing address translations between first set addresses and second set addresses in address translation storage; responding to a request issued as part of performing data processing operations comprising a first set address to return a response comprising a second set address if an address translation between the first set address and the second set address has been stored in the storing address translations step; forwarding the request towards the memory in the memory hierarchy if the address translation between the first set address and the second set address has not been stored in the storing address translations step; storing entries for received requests in a pending request storage; and if a stored entry in the pending request storage for a previous request is indicative that the previous request has been forwarded towards the memory and an expected response to the previous request will provide the address translation, intercepting the request to delay its reception by the address translation storage.

At least some embodiments provide an apparatus for data processing comprising: means for performing data processing operations on data items stored in a memory and retrieved via a memory hierarchy; means for storing address translations between first set addresses and second set addresses; means for responding to a request issued by the means for performing data processing operations comprising a first set address to return a response comprising a second set address if an address translation between the first set address and the second set address has been stored in the means for storing address translations; means for forwarding the request towards the memory in the memory hierarchy if the address translation between the first set address and the second set address has not been stored in the means for storing address translations; means for storing entries for received requests in a pending request storage; and means for intercepting the request to delay its reception by the means for storing address translation if a stored entry for a previous request is indicative that the previous request has been forwarded towards the memory and an expected response to the previous request will provide the address translation.

FIG. 1 schematically illustrates a data processing system 10 in one embodiment. The data processing system 10 comprises various different master devices of which GPU 12, video engine 14 and DMA (direct memory access) 16 are shown. Each of these data processing masters is configured to perform data processing operations with respect to data items which are stored in the memory 18. As part of performing these data processing operations, it is necessary to translate between addresses of a virtual memory system used by the master devices and physical addresses used by other hardware devices of the data processing system 10, such as the memory 18. In order to provide these address translations the data processing system 10 has a system-level memory management unit (MMU) 20 which is configured to receive requests for address translations (in particular specifying a virtual address) and to return a response to that request (in particular specifying a corresponding physical address). The MMU 20 performs the required translations on the basis of translation tables which it stores in multiple distributed translation lookaside buffers (TLBs), each of which provides translation services for a respective master device. These are shown as the L1 TLBs 22, 24 and 26, which are provided within the translation block units (TBUs) 28, 30 and 32. In addition, each TBU also has a mini-cache 34, 36 and 38 respectively, the configuration and function of which will be described in more detail below. If a request received from a master device cannot be translated by its own TBU (i.e. the required translation is not currently stored in its L1 TLB) then the request is passed to a second level TLB (L2 TLB 40) within a central translation control unit (TCU) 42 of the MMU 20. Further cache storage is provided in association with TCU 42 in the form of the TCU mini-cache 44, the configuration and function of which will be described in more detail below. The TCU mini-cache 44 comprises a request table 46. Transactions between the level 1 TBUs, the level 2 TCU, and the memory 18 are mediated by the interconnect 48. If a translation request also cannot be fulfilled by the L2 TLB then the page table walk (PTW) is passed from the TCU 42 out to memory 18, where the page tables 50 (in which the defined address translations are stored) are accessed and the PTW result is returned.

Figure 2:
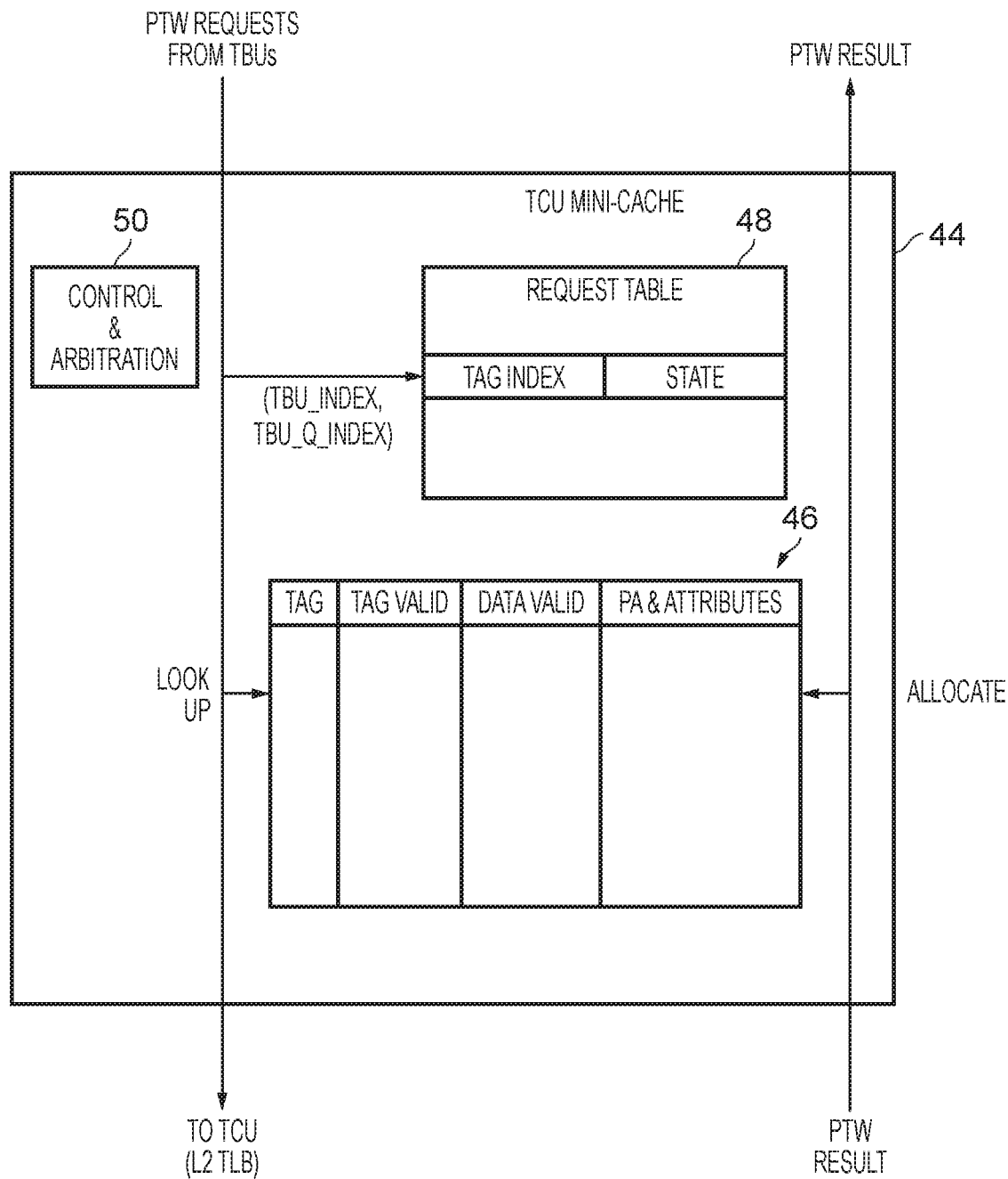
FIG. 2 schematically illustrates additional cache storage associated with a translation control unit in one embodiment.

FIG. 2 schematically illustrates in more detail the configuration of the TCU mini-cache 44. The TCU mini-cache 44 comprises cache storage (i.e. the storage capacity of the mini-cache itself) 46, and an associated request table 48, as well as a control and arbitration unit 50. As mentioned above, page table walk (PTW) requests are received from the TBUs 28, 30 and 32. All incoming PTW requests are stored in the request table 48, indexed by (TBU_Index, TBU_Q_Index), i.e. indicators for the particular TBU which issued this request and for a given queue position for requests from that TBU. Each entry stores (TAG_INDEX, STATE). The request table 48 is sized to be able to store all requests from all TBUs, and the illustrated example of FIG. 2 can store 128 (16×8) entries. The STATE held for each entry in the request table 48 can take one of five possible values:

1) IDLE—no request is currently held for this queue entry;

2) REQ—a page table walk request is pending in the TCU for this entry;

3) WAIT_FOR_HIT—a similar transaction is waiting for a page table walk result (which will also fulfil the address translation requirements for this entry);

4) INVALID—a request corresponding to this entry has returned a response indicating "don't update TLB". This means that this entry will need to restart to either become a REQ or WAIT_FOR_HIT state entry; and 5) HIT_READY—the required content of the mini-cache 46 is available for this entry and (pending restart arbitration between this request and others) the request can be directly returned with the corresponding PTW result.

The tag indexes stored in the request table point to entries in the cache storage 46, which caches physical addresses (PAs) and attributes when these have been returned as a PTW result. In the cache storage 46, the tag content is given by a combination of the values NS (indicating the security status of the requesting master), SID (stream ID) and VA (virtual address) in association with which the cache structure 46 stores a tag valid bit indicating the current validity of this tag entry. In addition for the same entry the cache storage 46 also stores a data valid bit indicating the validity of the "data", i.e. the PTW results (physical address (PA) and attributes). These entries within the cache structure 46 enable PTW requests received from a TBU to hit in the cache 46 when the physical address and attributes are available, but moreover enables the filtering of requests to the TCU, if a similar request has (recently) been forwarded to the TCU. The tag and data validity bits enable this in particular by use of three of the possible states for this two bit indication, which are described herein as:

1) Invalid—both tag and data contents are invalid;

2) Tag Valid—the tag content (NS, SID, VA) is valid (but the data is not), allowing incoming requests to have a "partial hit" in the cache storage 46 and wait until the PTW result is available; and 3) Tag and Data Valid—both the tag content and the data content are valid, and incoming PTW requests can be returned immediately with the FTW result.

Note that because the requests received from the TBUs by the TCU mini-cache 44 may not arrive at the TCU mini-cache in close temporal proximity (due to local delays, dependencies, etc.) it is beneficial to size the cache storage capability of the TCU mini-cache 44 so that cache entries are held for long enough to receive all striped transactions from all TBUs, and therefore to benefit from the feature that a PTW result returned for a request from one TBU may in fact be able to satisfy a request received for another TBU. It will be understood that the number of entries that can be stored in the cache storage 46 can therefore vary between embodiments (as an area/performance trade off) but in the example illustrated in FIG. 2 the cache storage 46 is configured to store 32 entries.

The control and arbitration unit 50 maintains overall control of the TCU mini-cache 44, and in particular of the operation of the request table 48 and the cache storage 46. It has access to the interconnect 48 (see FIG. 1) and is configured to snoop invalidate requests which are broadcast to the TBUs via the interconnect 48. When such an invalidate command is snooped on the interconnect (in particular on the invalidate bus) the control and arbitration unit 50 is configured to cause all content of the cache storage 46 that is in the "Tag and Data Valid" state to be updated to have the "Tag Valid" state. Note that the tag itself needs to remain valid as multiple entries in request table 48 may be pointing to this tag and need that information to progress their requests. The control and arbitration unit 50 is also configured, when a PTW result indicates "don't update TLB", to cause that particular corresponding entry in the cache storage 46 to be moved to the "tag valid" state. Finally, when a FTW result is returned from the TCU to the TCU mini-cache 44, a corresponding entry is allocated in the cache storage 46. However, note that a cache entry marked as "tag valid" cannot be evicted until no entries in the request table 48 are pointing to it. In the situation where one or more request table entries are pointing at all tags in the mini-cache, then the control and arbitration unit 50 intervenes to throttle incoming requests, until one of the entries can be evicted from the cache storage 46. Alternatively, in another embodiment (not explicitly illustrated) the request table 48 can be configured to store the tag itself, instead of a tag index pointing to the tag content of the cache storage 46. In other words the entry in the request table 48 then explicitly stores the above-mentioned (NS, SID, VA) combination. This enables an entry marked Tag Valid in the cache storage 46 to be overwritten even before it has been completed, however it also means that the corresponding the pending request(s) in the request table 48 also needs restarting (under control of the control and arbitration unit 50) in order to complete this request once space in the cache storage 46 becomes available.

Figure 3:
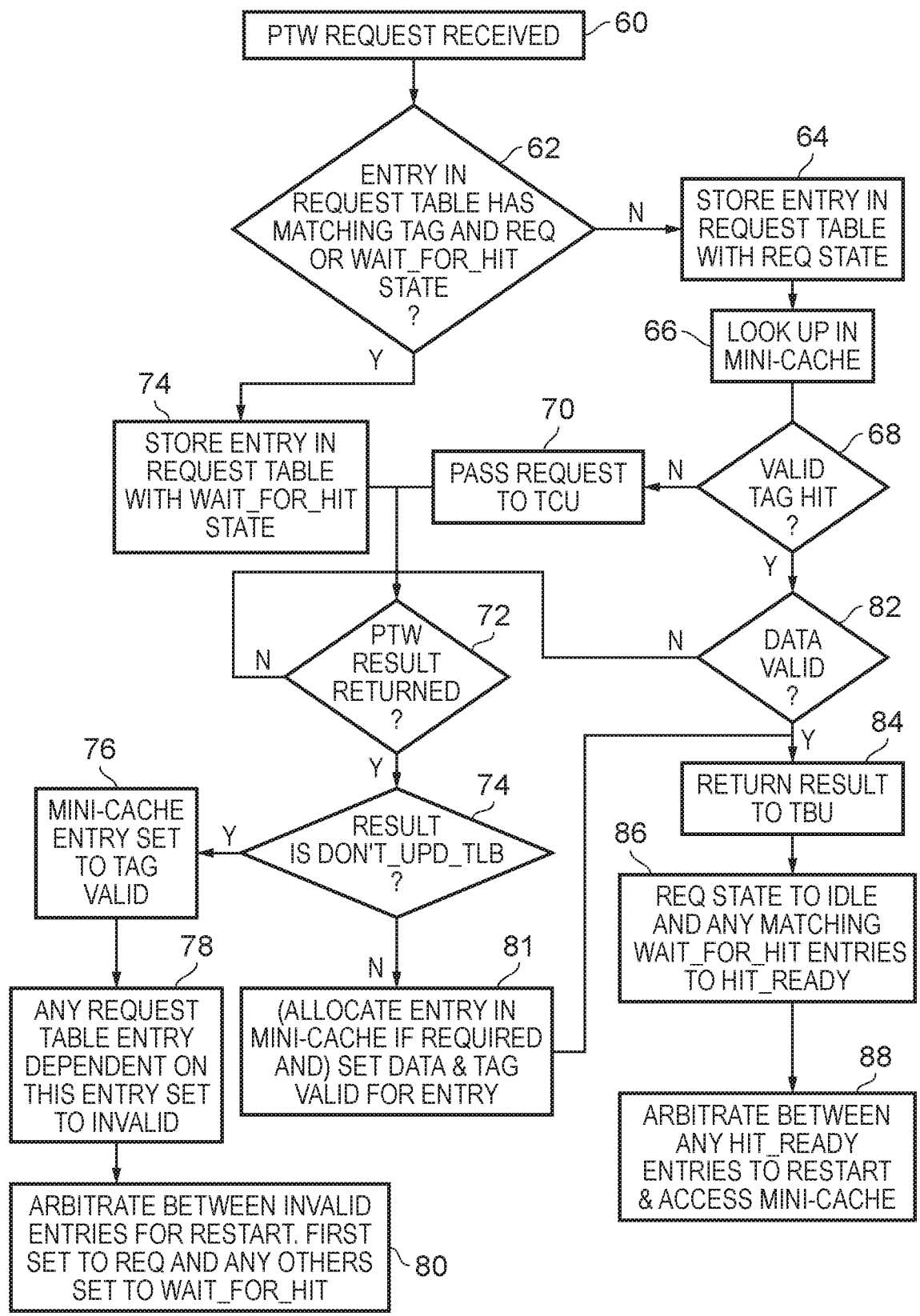
FIG. 3 shows a sequence of steps which are taken in method of one embodiment when operating the additional cache storage of FIG. 2.

FIG. 3 shows a sequence of steps which are taken in one embodiment when operating the TCU mini-cache 44 in FIG. 2. At step 60 a page table walk (PTW) request is received and then at step 62 it is determined if there is already an entry in the request table which has a matching tag and is marked as being in REQ or WAIT_FOR_HIT state. If no such entry exits, then the flow proceeds to step 64 where a new entry is made in the request table 48 for the newly received PTW request and it is marked with REQ state. A lookup is then performed in the mini-cache (i.e. cache storage 46 in FIG. 2) at step 66. If (at step 68) there is no valid tag hit then the request is passed on to the TCU (step 70) and (with regard to this request) the flow waits at step 72 for the FTW results to be returned. Note that the comment that the waiting at step 72 applies to this request is to emphasise that the entire function of the TCU mini-cache 44 does not wait until the FTW result is returned for this particular request and further PTW requests can be received, processed and so on in the interim. Returning to a consideration of step 62, if it found that there is a corresponding entry in the request table with a matching tag having REQ or WAIT_FOR_HIT state then the flow proceeds to step 74 where an entry stored in the request table 48 is made with the WAIT_FOR_HIT state. The flow then also proceeds to step 72 where (with regard to this request) the flow waits unit the PTW result is returned. Once the FTW result is returned at step 72, it is determined at step 74 if the result indicates that the status "don't update TLB" is indicated. If it is, then at step 76 the allocated entry in the cache storage 46 is set to have the Tag Valid status (i.e. data invalid). Then at step 78 any request table entry which is dependent on this cache entry (i.e. the tag index points to this entry) is set to INVALID state. Finally, at step 80 these entries in request table 48 which are now indicated as INVALID are arbitrated between for restarting. A first of these is then set to REQ status, whilst any others are set to WAIT_FOR_HIT state. If however at step 74 it is determined that the PTW result does not indicates "don't update TLB" then the flow proceeds to step 81 where, if necessary once an entry has been allocated in the cache storage 46, the entry for this result is set to Data and Tag Valid status. The flow then proceeds to step 84 (see below).

Returning to a consideration of step 68, if it is determined there that when the lookup in the cache storage 46 was performed for the incoming PTW request there was a valid tag hit, then at step 82 it is determined if the data is also indicated as being valid. If it is not, a corresponding request is currently pending in the TCU and the flow proceeds to step 72 to wait for the PTW result to be returned. If however, at step 82 the data is also indicated has being valid then the PTW result is immediately available and at step 84 it is returned from the cache storage to the TBU. Thereafter at step 86 the state of the request in table 48 is moved from REQ to IDLE and any corresponding WAIT_FOR_HIT entries are updated to HIT_READY status. Then at step 88 the HIT_READY entries in the request table 48 are arbitrated between to be restarted and access the available cached entry which will now satisfy those requests.

Figure 4:
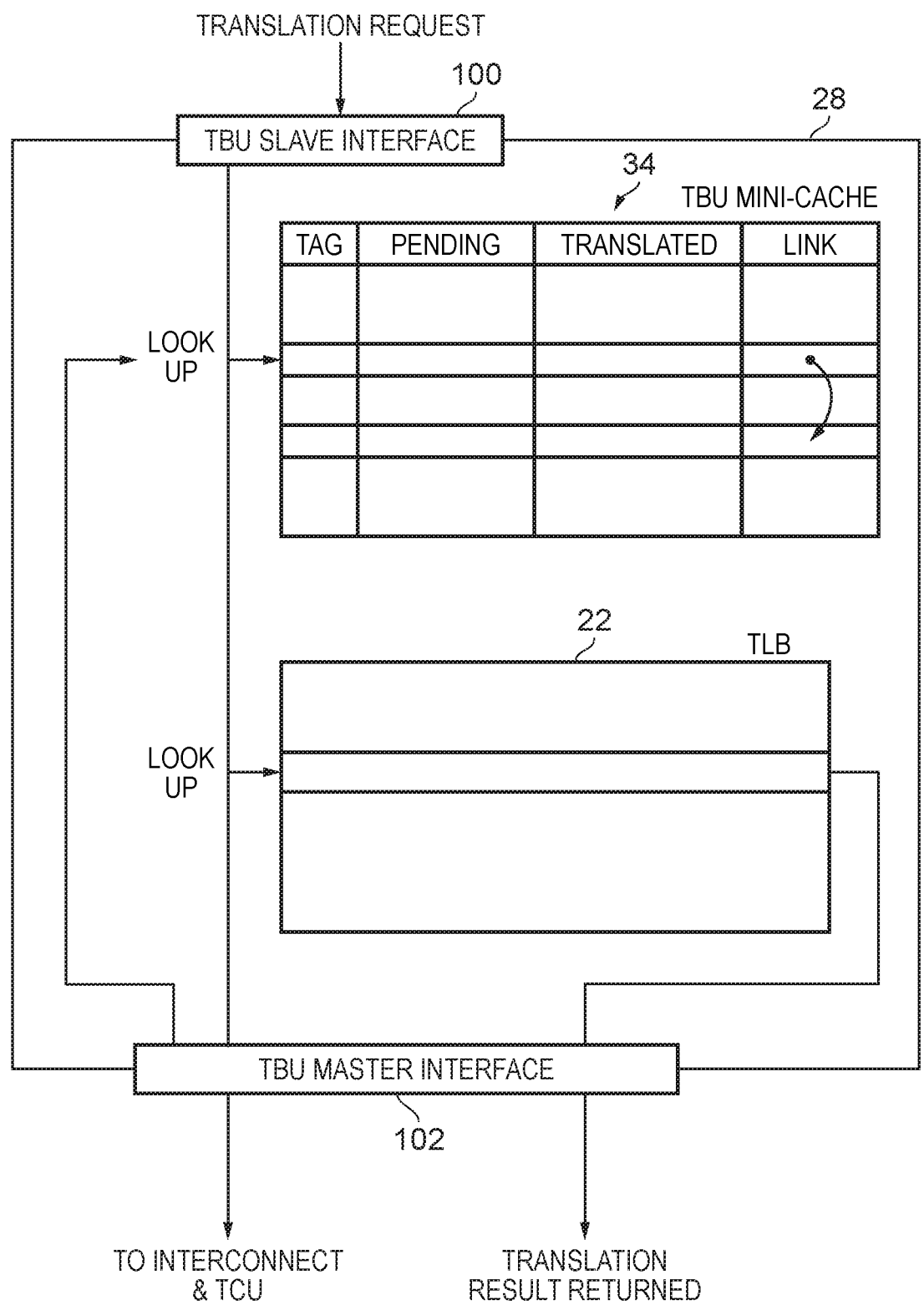
FIG. 4 schematically illustrates additional cache storage associated with a translation buffer unit in one embodiment.

FIG. 4 schematically illustrates in more detail the configuration of the TBU 28 shown in FIG. 1. TBUs 30 and 32 are similarly configured. Translation requests for this TBU are received via its slave interface 100, and the arrival of a translation request at the TBU slave interface 100 causes a lookup to be performed in the TBU mini-cache 34. The (NS, SID, VA) combination for this translation request is compared with the content of the mini-cache 34 and if a cache miss occurs then a new entry for this translation request is created in the TBU mini-cache 34, marked as "pending". The translation request is then passed on to the TLB 22 where it is handled in the usual fashion, i.e. if a cache hit occurs in the TLB 22 then the cached translation is returned, whereas if a miss occurs then the translation request is passed (via the interconnect) to the TCU. If however, when looking up in the TBU mini-cache 34 it is found that there is a matching tag marked as "pending" then the request is intercepted and does not yet proceed to the TLB 22. An entry created for this translation request is also marked as "pending" and a link is stored to the pre-existing pending entry where the tag matched. When a translation request arrives at the TBU master interface 102 it also causes a lookup to be performed in the TBU mini-cache 34. If this hits on a "pending" entry then the entry is updated instead to be "translated" and any linked entries in the TBU mini-cache 34 are unblocked to be passed downstream (i.e. to the TLB 22). An entry in the TBU mini-cache 34 may not be evicted whilst it is "pending" but can be once it has moved to "translated" status.

Figure 5:
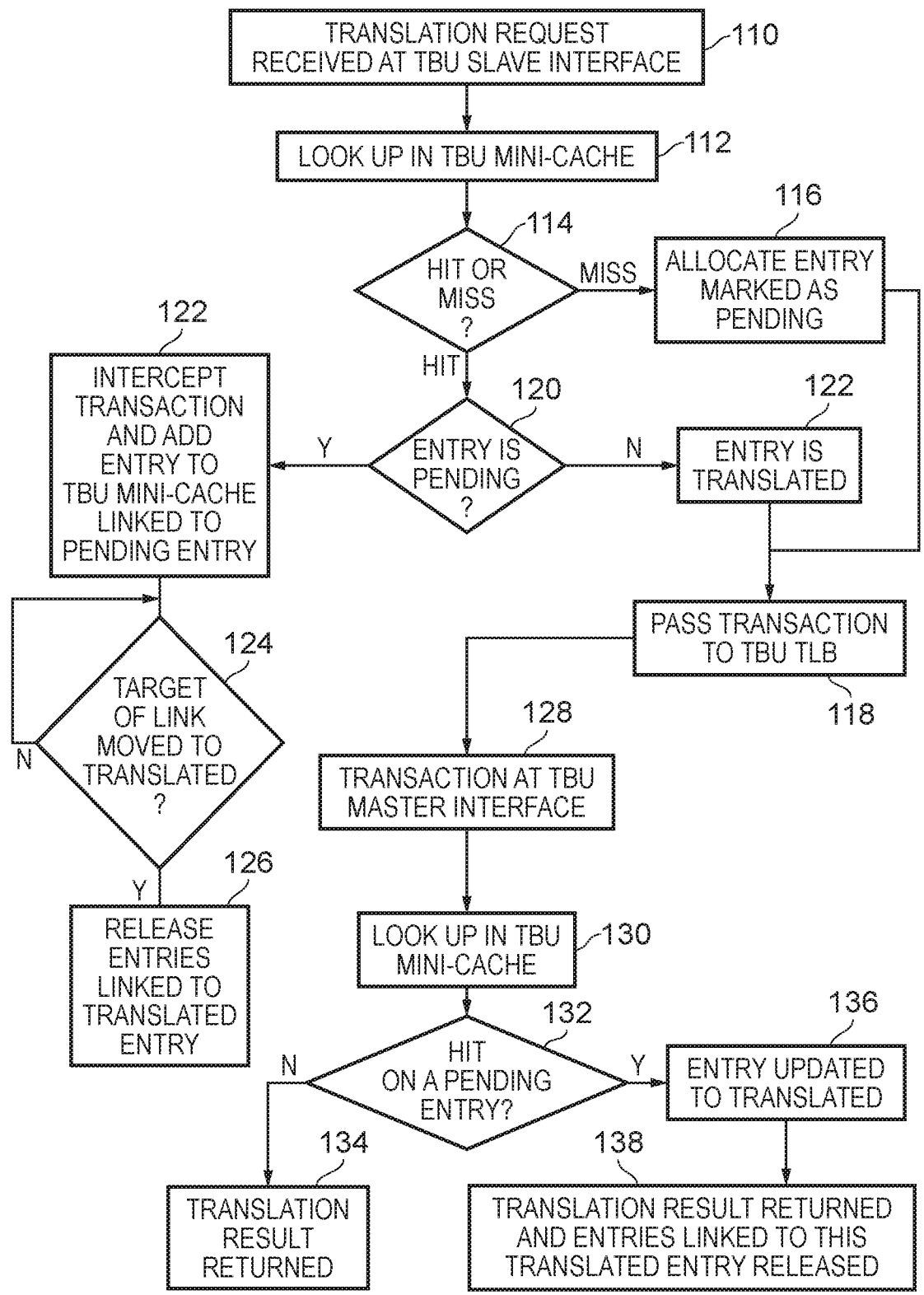
FIG. 5 shows a sequence of steps which are taken by the method of one embodiment when operating the additional cache storage shown in FIG. 4.

FIG. 5 shows a sequence of steps which are taken when operating the TBU 28 shown in FIG. 4. At step 110 a translation request is received at the TBU slave interface and at step 112 a lookup is performed in the TBU mini-cache. It is determined at step 114 if a hit or a miss results (i.e. whether there is a matching tag or not). If the lookup misses, then the flow proceeds to step 116 where an entry in the TBU mini-cache 34 is allocated for this request and is marked as "pending". The request is then passed downstream to the TBU TLB (step 118). If however at step 114 a hit occurs then it is further determined at step 120 if the entry for which the hit occurred is marked as pending. If it is marked as pending then the flow proceeds to step 122, where the transaction is intercepted and an entry is added to the TBU mini-cache linked to this pre-existing pending entry. Then (at step 124) the flow waits until the target of the link is moved to "translated" status. Again, in similar manner to the description of FIG. 3 above, this "waiting" is only with respect to this particular request and the operation of the TBU continues in the interim, handling further pending and newly received requests. However, once the target of the link is moved to translated, then at step 126 any entries which are linked to the translated entry are then released to be allowed to pass downstream to the TLB 22.

Returning to a consideration of step 120, if it is found that the entry in the TBU mini-cache 24 which caused the hit is not marked as pending, then it must (at step 122) be marked as translated and the flow then proceeds to step 118 where this transaction is passed to the TLB. From step 118, the flow proceeds to step 128 where, once the transaction arrives at the master interface of the TBU this also causes (at step 130) a lookup to be performed in the TBU mini-cache. At step 132 it is determined if this lookup resulted in a hit on a "pending" entry. If it does not then the translation result requested is simply returned (step 134). If however, such a hit does occur then the flow proceeds to step 136 where the corresponding entry is updated to "translated" status and consequently at step 138 not only is the translation result returned, but any entries linked to this (now) translated entry are then released to proceed downstream i.e. to the TLB.

In brief overall summary an apparatus for data processing and a method of data processing are provided. Address translation storage stores address translations between first set addresses and second set addresses, and responds to a request comprising a first set address to return a response comprising a second set address if the required address translation is currently stored therein. If it is not the request is forwarded towards memory in a memory hierarchy. A pending request storage stores entries for received requests and in response to reception of the request, if a stored entry for a previous request indicates that the previous request has been forwarded towards the memory and an expected response to the previous request will provide the address translation, intercepts the request to delay its reception by the address translation storage. Bandwidth pressure on the address translation storage is thus relieved.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus for data processing comprising:
   data processing circuitry to perform data processing operations on data items stored in a memory and retrieved via a memory hierarchy;
   address translation storage to store address translations between first set memory addresses and second set memory addresses,
   wherein the address translation storage is responsive to a request issued by the data processing circuitry comprising a first set memory address to return a response comprising a second set memory address if an address translation between the first set memory address and the second set memory address is stored in the address translation storage, and to forward the request towards the memory in the memory hierarchy if the address translation between the first set memory address and the second set memory address is not stored in the address translation storage; and
   pending request storage to store entries for received requests received from the data processing circuitry prior to being received by the address translation storage,
   wherein the pending request storage is responsive to reception of the request, to perform a memory address comparison of the first set memory address of the request with the first set memory address of an earlier request indicated by a stored entry of the pending request storage, and if the memory address comparison is indicative that the earlier request has been forwarded towards the memory and an expected response to the earlier request will provide the address translation, to intercept the request to delay its reception by the address translation storage;
   wherein the pending request storage is responsive to the expected response to the earlier request providing the address translation to release the request to the address translation storage.

2. The apparatus as claimed in claim 1, wherein the data processing circuitry comprises multiple master devices and the pending request storage has structure to store requests from each of the multiple master devices.

3. The apparatus as claimed in claim 2, further comprising a translation lookaside buffer to store address translations between first set memory addresses and second set memory addresses for the multiple master devices, and wherein the address translation storage is a cache associated with the pending request storage, and wherein forwarding the request towards the memory in the memory hierarchy comprises forwarding the request to the translation lookaside buffer.

4. The apparatus as claimed in claim 1, wherein the data processing circuitry comprises a master device capable of issuing the request and the pending request storage is capable of storing requests from only the master device.

5. The apparatus as claimed in claim 4, wherein the address translation storage is a translation lookaside buffer to store address translations between first set memory addresses and second set memory addresses for the master device.

6. The apparatus as claimed in claim 4, wherein forwarding the request towards the memory in the memory hierarchy comprises forwarding the request to a further translation lookaside buffer shared with at least one other master device.

7. The apparatus as claimed in claim 4, wherein the pending request storage has a cache structure and is responsive to reception of the request to perform a lookup in the cache structure to determine if an entry is stored for the earlier request and if the expected response to the earlier request will provide the address translation.

8. The apparatus as claimed in claim 1, wherein each of the entries stored in the pending request storage comprises a reference to an entry in the address translation storage.

9. The apparatus as claimed in claim 1, wherein the pending request storage is responsive to the stored entry for the earlier request being indicative that the earlier request has been forwarded towards the memory and the expected response to the earlier request will provide the address translation to store a link from the entry for the request to the stored entry for the earlier request.

10. The apparatus as claimed in claim 1, wherein each of the entries stored in the pending request storage comprises a status indicator, wherein the status indicator indicates a pending status whilst a response has not yet been received to a request corresponding to that entry which has been forwarded towards the memory in the memory hierarchy.

11. The apparatus as claimed in claim 10, wherein the pending request storage is responsive to reception of the request, if the stored entry for the earlier request comprises the status indicator indicating the pending status, to store a dependent waiting status as the status indicator corresponding to the request.

12. The apparatus as claimed in claim 11, wherein the pending request storage is responsive to reception of the expected response to release a request for which the entry in the pending request storage has the status indicator indicating the dependent waiting status such that it is received by the address translation storage.

13. The apparatus as claimed in claim 10, wherein the pending request storage is responsive to reception of the expected response to release a request for which the entry in the pending request storage has the status indicator indicating the pending status such that it is received by the address translation storage.

14. A method of data processing comprising the steps of:
    performing, by data processing circuitry, data processing operations on data items stored in a memory and retrieved via a memory hierarchy;
    storing address translations between first set memory addresses and second set memory addresses in address translation storage;
    detecting an address translation between the first set memory address and the second set memory address has been stored in the storing address translations step and responding to a request issued as part of performing data processing operations comprising a first set memory address to return a response comprising a second set memory address;

detecting the address translation between the first set memory address and the second set memory address has not been stored in the storing address translations step and forwarding the request towards the memory in the memory hierarchy;

storing entries for received requests from the data processing circuitry in a pending request storage prior to being received by the address translation storage;

performing a memory address comparison of the first set memory address of the request with the first set memory address of an earlier request indicated by a stored entry of the pending request storage;

determining that the memory address comparison indicates that the earlier request has been forwarded towards the memory and that an expected response to the earlier request will provide the address translation, and in response to the determining, intercepting the request to delay its reception by the address translation storage; and detecting the expected response to the earlier request providing the address translation and releasing the request to the address translation storage.

15. Apparatus for data processing comprising:

means for performing data processing operations on data items stored in a memory and retrieved via a memory hierarchy;

means for storing address translations between first set addresses and second set addresses;

means for responding to a request issued by the means for performing data processing operations comprising a first set address to return a response comprising a second set address if an address translation between the first set address and the second set address has been stored in the means for storing address translations;

means for forwarding the request towards the memory in the memory hierarchy if the address translation between the first set address and the second set address has not been stored in the means for storing address translations;

means for storing entries for received requests in a pending request storage from the means for performing data processing operations prior to being received by the means for storing address translations, for performing in response to reception of the request a memory address comparison of the first set memory address of the request with the first set memory address of an earlier request indicated by a stored entry of the pending request storage, and for intercepting the request to delay its reception by the means for storing address translations if the memory address comparison is indicative that the earlier request has been forwarded towards the memory and an expected response to the earlier request will provide the address translation; and means for releasing the request to the means for storing address translations in response to the earlier request providing the address translation.

* * * * *